United States Patent
Gao et al.

(10) Patent No.: US 11,317,117 B2
(45) Date of Patent: *Apr. 26, 2022

(54) METHOD OF CODING ATTRIBUTES FOR POINT CLOUD CODING

(71) Applicant: TENCENT AMERICA LLC, Palo Alto, CA (US)

(72) Inventors: Wen Gao, West Windsor, NJ (US); Xiang Zhang, Los Angeles, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/139,177

(22) Filed: Dec. 31, 2020

(65) Prior Publication Data

US 2021/0306664 A1    Sep. 30, 2021

Related U.S. Application Data

(60) Provisional application No. 63/002,316, filed on Mar. 30, 2020.

(51) Int. Cl.
*H04N 19/597* (2014.01)
*H04N 19/124* (2014.01)
(Continued)

(52) U.S. Cl.
CPC ......... *H04N 19/597* (2014.11); *H04N 19/103* (2014.11); *H04N 19/119* (2014.11); *H04N 19/124* (2014.11); *H04N 19/136* (2014.11); *H04N 19/147* (2014.11); *H04N 19/159* (2014.11); *H04N 19/70* (2014.11)

(58) Field of Classification Search
CPC .......................... H04N 19/597; H04N 19/147
See application file for complete search history.

(56) References Cited

U.S. PATENT DOCUMENTS

2007/0040711 A1    2/2007  Ziauddin
2018/0189578 A1*   7/2018  Yang ................. G06K 9/00798
(Continued)

OTHER PUBLICATIONS

International Search Report dated May 5, 2021 from the International Searching Authority in International Application No. PCT/US2021/018105.

(Continued)

*Primary Examiner* — Jerry T Jean Baptiste
(74) *Attorney, Agent, or Firm* — Sughrue Mion, PLLC

(57) ABSTRACT

A method, a non-transitory computer readable medium, and a computer system is provided for encoding or decoding video data. The method may include: receiving an entropy coded bitstream comprising compressed video data including point cloud occupancy codes; generating one or more dequantized dimensions of a boundary box of a point cloud; based on determining that the compressed video data was predicted by using the attribute-based predictor, determining a predictor for decoding is the attribute-based predictor; based on determining that the compressed video data was predicted by using the attribute-based predictor, determining the predictor for decoding is the geometry-based predictor; and building an octree structure by using the determined predictor.

20 Claims, 10 Drawing Sheets

(51) Int. Cl.
*H04N 19/159* (2014.01)
*H04N 19/147* (2014.01)
*H04N 19/119* (2014.01)
*H04N 19/70* (2014.01)
*H04N 19/136* (2014.01)
*H04N 19/103* (2014.01)

(56) References Cited

U.S. PATENT DOCUMENTS

2019/0081638 A1* 3/2019 Mammou ........... H03M 7/6064
2020/0021844 A1 1/2020 Yea et al.

OTHER PUBLICATIONS

Written Opinion dated May 5, 2021 from the International Searching Authority in International Application No. PCT/US2021/018105.
"G-PCC codec description v5", International Organisation for Standardisation Organisation Internationale de Normalisation, ISO/IEC JTC1/SC29/WG11 N18891, Oct. 2019, 74pages.
"Information technology—MPEG-I (Coded Representation of Immersive Media)—Part 9: Geometry-based Point Cloud Compression", ISO/IEC JTC 1/SC29/WG11, 104pages.
Christian Tulvan et al., "Use Cases for Point Cloud Compression (PCC)", International Organisation for Standardisation Organisation Internationale de Normalisation, ISO/IEC JTC1/SC29/WG11 MPEG2015/N16331, Jun. 2016, 8pages.
Rufael Mekuria et al., "Requirements for Point Cloud Compression", International Organisation for Standardisation Organisation Internationale de Normalisation, ISO/IEC JTC1/SC29/WG11 MPEG2016/n16330, Feb. 2016, 3pages.

* cited by examiner

Octree-partition in 3D space

Octree-partition and tree structure

FIG. 7　Streaming System 200

METHOD OF CODING ATTRIBUTES FOR POINT CLOUD CODING

PRIORITY INFORMATION

This application claims the benefit of priority from U.S. Provisional Application No. 63/002,316 filed Mar. 30, 2020, which is hereby incorporated by reference in its entirety.

FIELD

The disclosure relates generally to the field of data processing, and more particularly to Point Cloud Coding (POC), including methods of attribute coding including predictor selection and entropy coding of residuals are disclosed.

BACKGROUND

A point cloud is a set of data points in space that may represent a three-dimensional (3D) shape. Point cloud technology has been widely used in recent years. For example, point cloud technology may be used in autonomous driving vehicles for object detection and localization; geographic information systems (GIS) for mapping, and cultural heritage to visualize and archive cultural heritage objects and collections, etc.

Point clouds contain a set of high dimensional data points, each including 3D position information and additional attributes such as color, reflectance, etc. They can be captured using multiple cameras and depth sensors, or Light Detection and Ranging (Lidar) in various setups, and may be made up of thousands up to billions of points to realistically represent the original scene(s).

Compression technologies are needed to reduce the amount of data required to represent a point cloud for faster transmission and/or reduction of storage.

SUMMARY

Embodiments relate to a method, system, and non-transitory computer readable medium for encoding and/or decoding video data. According to one aspect, a method for decoding video data is provided. The method may include: receiving an entropy coded bitstream comprising compressed video data including point cloud occupancy codes; generating one or more dequantized dimensions of a boundary box of a point cloud by a process comprising: parsing dimensions of the boundary box of the point cloud from the bitstream; entropy-decoding the entropy coded dimensions of the boundary box of the point cloud; and dequantizing the dimensions of the boundary box of the point cloud; determining whether the compressed video data was predicted by using an attribute-based predictor or a geometry-based predictor; based on determining that the compressed video data was predicted by using the attribute-based predictor, determining a predictor for decoding is the attribute-based predictor; based on determining that the compressed video data was predicted by using the attribute-based predictor, determining the predictor for decoding is the geometry-based predictor; and building an octree structure by subdividing the boundary box of the point cloud according to the dequantized dimensions of the boundary box including the occupancy codes of the point cloud by using the determined predictor.

The method may further comprise: selecting the attribute-based predictor or the geometry-based predictor based on a geometry position of points in a candidate list.

The method may further comprise: determining whether the compressed video data was predicted by using the attribute-based predictor or the geometry-based predictor based on signaling in syntax of the bitstream.

The method may further comprise: when an attribute of the occupancy codes is a scalar value, determining that the predictor for decoding is the geometry-based predictor.

The predictor for decoding may be binarized into a fixed-length code and individual bits are arithmetic code encoded with context modeling.

The predictor for decoding may be binarized into a truncate unary (TU) code with a maximum value set as the maximum value of the predictor for decoding.

The attributes of the point cloud may include one or more of color or reflectance.

The method may further comprise: determining an average of a residual per chuck for each of the attribute-based predictor and the geometry-based predictor; and determining whether to use the attribute-based predictor or the geometry-based predictor based on the determined averages of the residual.

The method may further comprise: when a residual or a converted residual is less than a truncated unary (TU) code maximum, using a TU code with a maximum value for the encoding; and when the residual or the converted residual is not less than the TU code maximum, using an exponential code for the encoding.

The exponential code may be an Exponential Golomb code with order 0.

The method may further comprise: for bits in the TU code, using a context based arithmetic code; and for bits in the exponential code, using bypass coding.

The method may further comprise: starting with the geometry-based predictor; after a period of time, comparing a chunk of points with a threshold; when the chunk of points is greater than the threshold, using the attribute-based predictor.

The method may further comprise: selecting a best prediction candidate based on a rate-distortion optimization method where the best prediction candidate leads to a minimal cost of rate and distortion function.

The method may further comprise: generating a displayable image based at least in part on the built octree structure; and performing control so that the displayable image is displayed by a display.

According to an embodiment, a computer system for decoding video data may be provided, which may comprise: one or more computer-readable non-transitory storage media configured to store computer program code; and one or more computer processors configured to access said computer program code and operate as instructed by said computer program code, said computer program code including: receiving code configured to cause the one or more computer processors to receive an entropy coded bitstream comprising compressed video data including point cloud occupancy codes; dequantization code configured to cause the one or more computer processors to generate one or more dequantized dimensions of a boundary box of the point cloud by a process comprising: parsing dimensions of the boundary box of the point cloud from the bitstream, entropy-decoding the entropy coded dimensions of the boundary box of the point cloud, and dequantizing the dimensions of the boundary box of the point cloud; determining code configured to cause the one or more computer processors to determine whether the compressed video data was predicted by using an attribute-based predictor or a geometry-based predictor; predictor selection code configured to cause the one or more computer processors to: based on determining that the compressed video data was predicted by using the attribute-based predictor, determining a predictor for decoding is the attribute-based predictor; based on determining that the compressed video data was predicted by using the attribute-based predictor, determining the predictor for decoding is the geometry-based predictor; and octree building code configured to cause the one or more computer processors to build an octree structure by subdividing the boundary box of the point cloud according to the dequantized dimensions of the boundary box including the occupancy codes of the point cloud by using the determined predictor.

The predictor selection code may be further configured to cause the one or more computer processors to: determine whether the compressed video data was predicted by using the attribute-based predictor or the geometry-based predictor based on signaling in syntax of the bitstream.

The computer system may further comprise a display, wherein the computer program code further comprises: display code configured to cause the at one or more processors to: generate a displayable image based at least in part on the built octree structure, and perform control so that the displayable image is displayed by the display.

The attributes of the point cloud may include one or more of color or reflectance.

According to an embodiment, a non-transitory computer readable medium having stored thereon a computer program for decoding video data\ may include where the computer program is configured to cause one or more computer processors to: receive an entropy coded bitstream comprising compressed video data including point cloud occupancy codes; generate one or more dequantized dimensions of a boundary box of a point cloud by a process comprising: parsing dimensions of the boundary box of the point cloud from the bitstream; entropy-decoding the entropy coded dimensions of the boundary box of the point cloud; and dequantizing the dimensions of the boundary box of the point cloud; determining whether the compressed video data was predicted by using an attribute-based predictor or a geometry-based predictor; based on determining that the compressed video data was predicted by using the attribute-based predictor, determining a predictor for decoding is the attribute-based predictor; based on determining that the compressed video data was predicted by using the attribute-based predictor, determining the predictor for decoding is the geometry-based predictor; and build an octree structure by subdividing the boundary box of the point cloud according to the dequantized dimensions of the boundary box including the occupancy codes of the point cloud by using the determined predictor.

The computer program of the non-transitory computer-readable storage medium may be further configured to cause the one or more computer processors to: generate a displayable image based at least in part on the built octree structure; and perform control so that the displayable image is displayed by a display.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and/or decoding. The following described exemplary embodiments provide a system, method and computer program to, among other things, encode and/or decode video data.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 6:
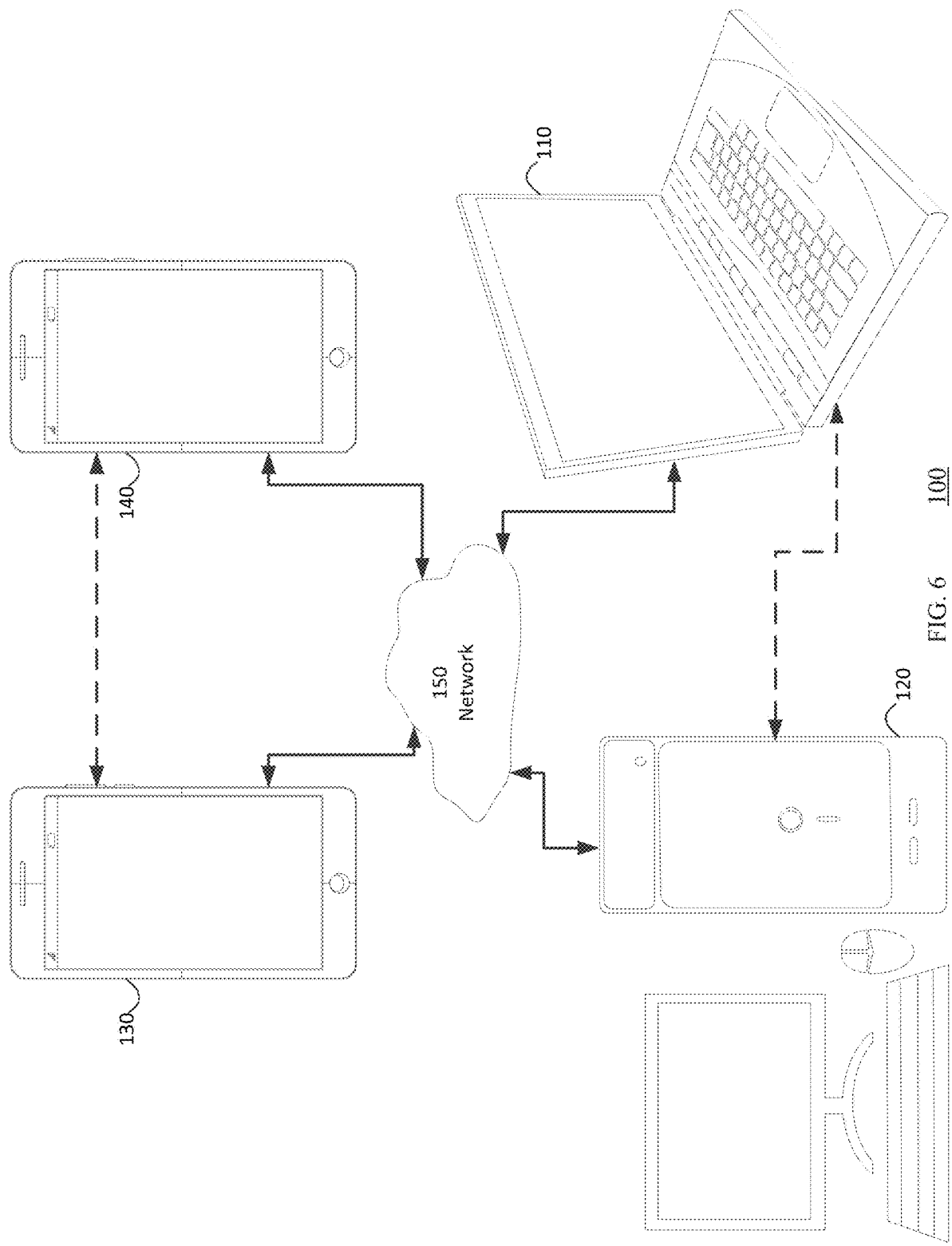
FIG. 6 shows a functional block diagram of a networked computer environment illustrating a video coding system for encoding and/or decoding video data according to an embodiment.

Referring now to FIG. 6, a functional block diagram of a networked computer environment illustrating a video coding system 100 (hereinafter "system") for encoding and/or decoding video data according to an embodiment. It should be appreciated that FIG. 6 provides only an illustration of one implementation and does not imply any limitations with regard to the environments in which different embodiments may be implemented. Many modifications to the depicted environments may be made based on design and implementation requirements.

As shown in FIG. 6, the communication system (100), according to an embodiment of the present disclosure, may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 6 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 6, the terminals (110-140) may be illustrated as a laptop 110, a server 120, and smartphones 130 and 140, but the principles of the present disclosure are not so limited. Embodiments of the present disclosure find application with other equipment including but not limited to laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 7:
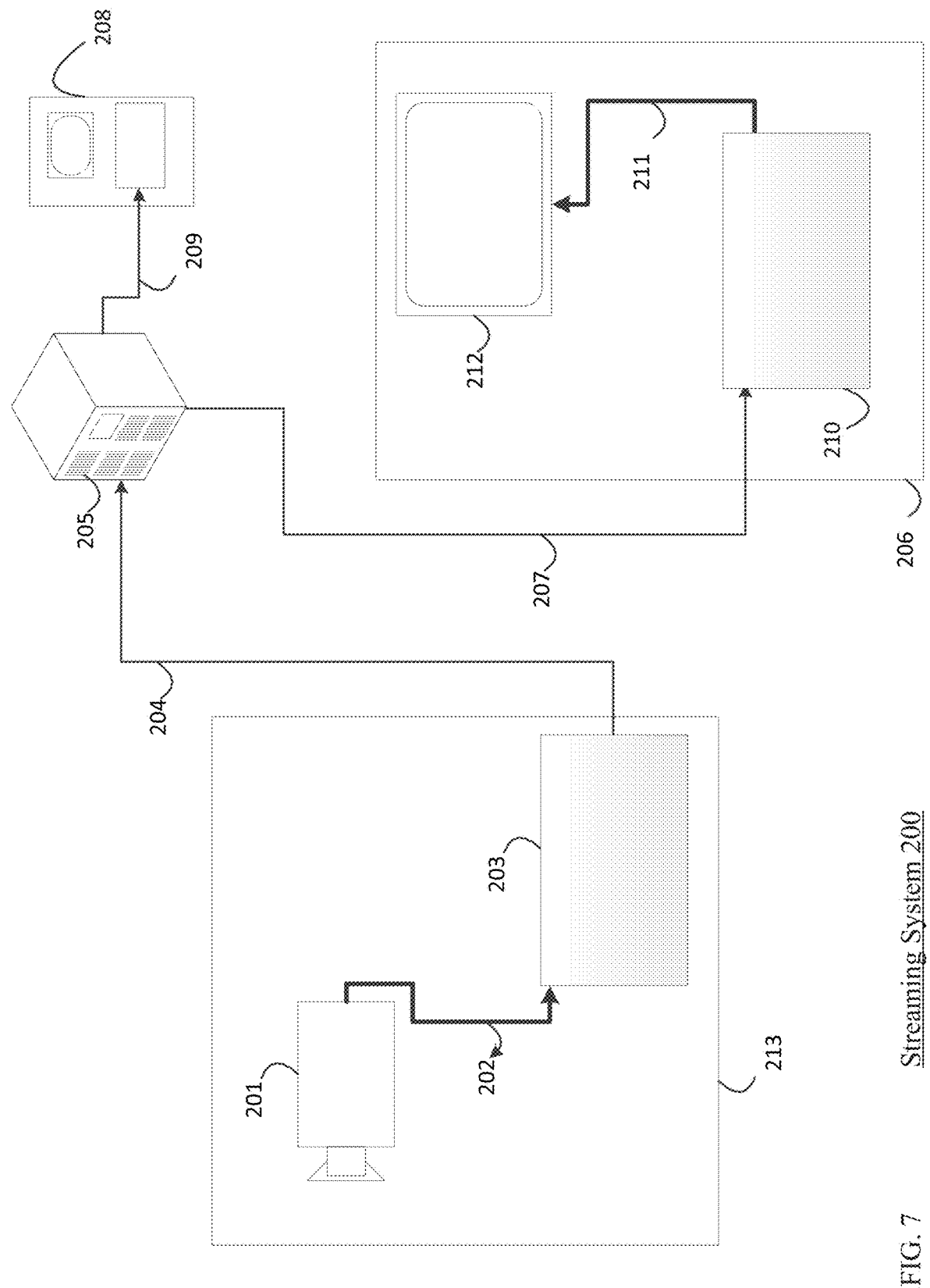
FIG. 7 illustrates the placement of a decoder in a streaming environment/streaming system, according to an embodiment.

FIG. 7 illustrates, as an example for an application for the disclosed subject matter, the placement of a decoder 210 in a streaming environment/streaming system 200. Decoder 210 is further discussed with reference to FIG. 8 and the decoder 433 in FIG. 9. The decoder 210 may correspond to decoder 210 in FIG. 3 or the decoder 433 in FIG. 9.

The disclosed subject matter can be equally applicable to other video enabled applications, including, for example, video conferencing, digital TV, storing of compressed video on digital media including CD, DVD, memory stick and the like, and so on.

As shown in FIG. 7, a streaming system (200) may include a capture subsystem (213), which can include a video source (201), for example a digital camera, which may create an uncompressed video sample stream (202). That sample stream (202), depicted as a bold line to emphasize a high data volume when compared to encoded video bit streams, can be processed by a source encoder (203) coupled to the camera (201). The source encoder (203) can include hardware (e.g., a processor or circuit and memory), software, or a combination thereof to enable or implement aspects of the disclosed subject matter as described in more detail below. The encoded video bit stream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which may decode the incoming copy of the encoded video bitstream (207) and may create an outgoing video sample stream (211) that can be rendered on a display (212) or other rendering device.

Figure 8:
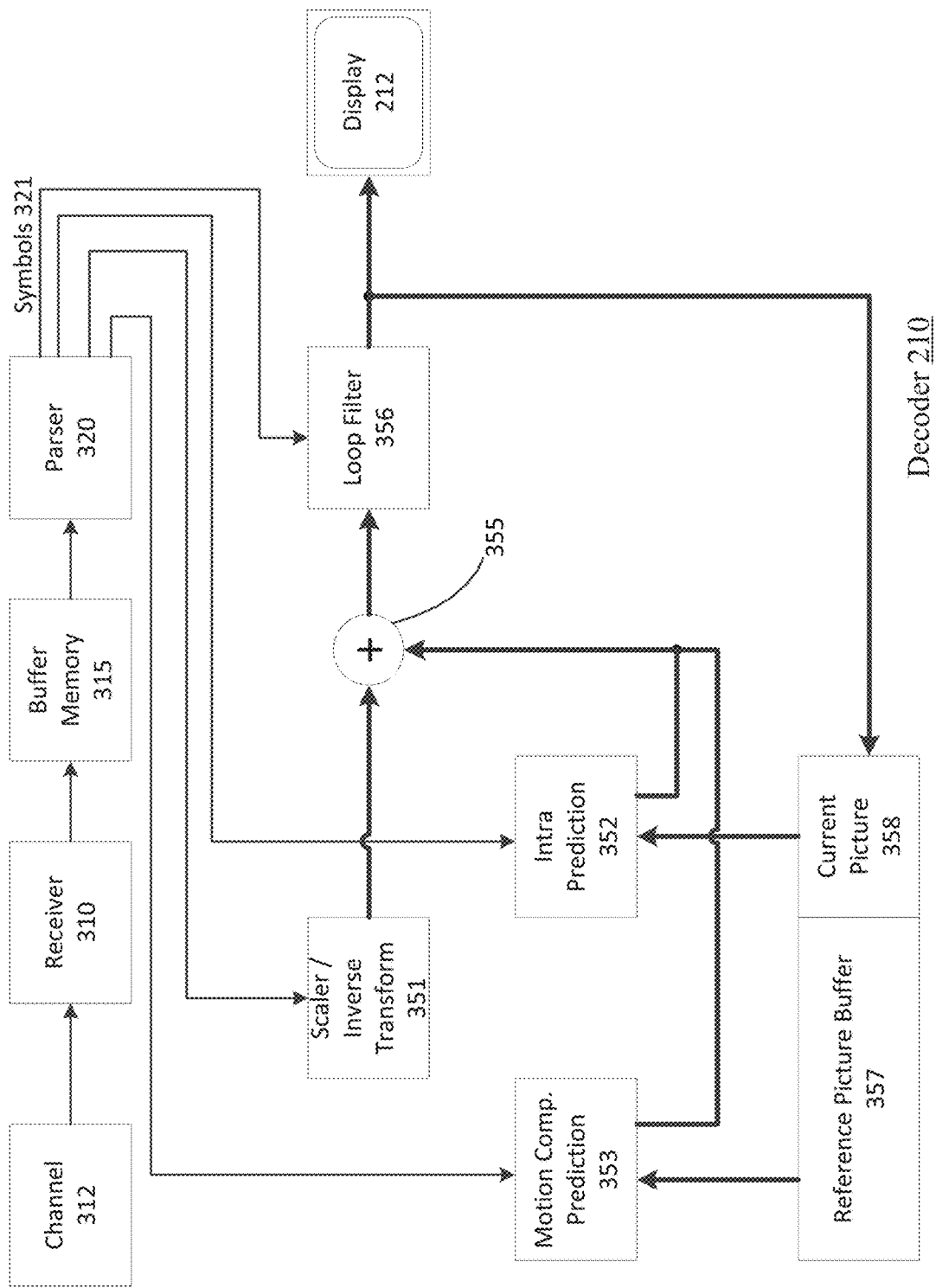
FIG. 8 illustrates a functional block diagram of a decoder (e.g., a video decoder) according to an embodiment.

FIG. 8 illustrates a functional block diagram of a decoder (210) (e.g., a video decoder) according to an embodiment of the present disclosure. As shown in FIG. 8, a receiver (310) may receive one or more codec video sequences to be decoded by the decoder (210). In the same or another embodiment, one coded video sequence may be received at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between a receiver (310) and an entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, which can be comparatively large and can advantageously be of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as shown in FIGS. 7 and 8. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser 320 may also extract from the coded video sequence information such as transform coefficients, quantizer parameter values, motion vectors, and so forth.

The parser (320) may perform entropy decoding/parsing operation on the video sequence received from the buffer (315), so as to create symbols (321). Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit may be the scaler/inverse transform unit (351). The scaler/inverse transform unit (351) may receive a quantized transform coefficient as well as control information, including which transform to use, a block size, a quantization factor, quantization scaling matrices, etc. as symbol(s) (321) from the parser (320). It can output blocks comprising sample values that can be input into an aggregator (355).

In some cases, the output samples of the scaler/inverse transform (351) can pertain to an intra-coded block, which is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter-coded block, and a potentially motion compensated block. In such a case, a Motion Compensation Prediction unit (353) can access reference a picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), and/or maximum reference picture size. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 9:
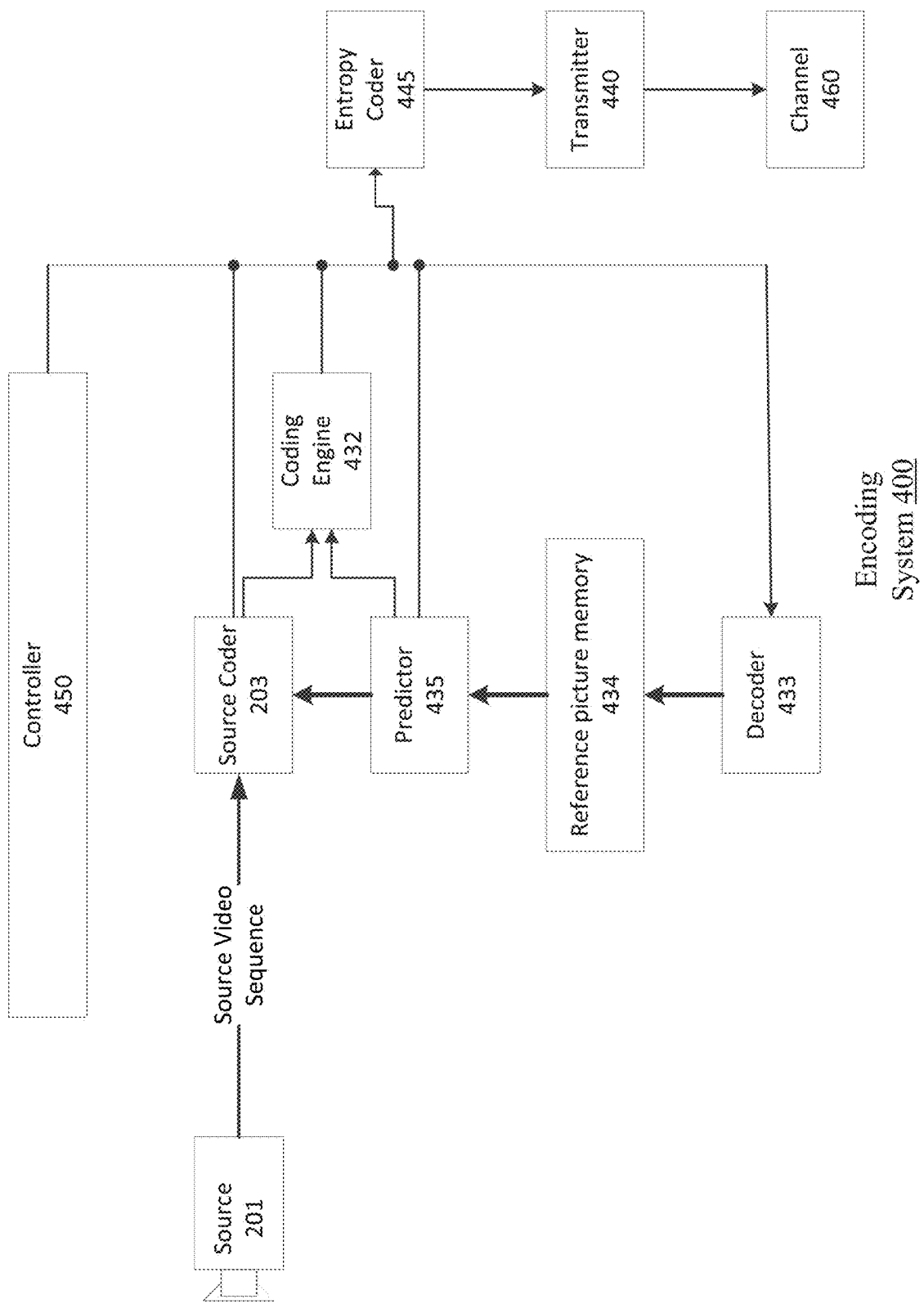
FIG. 9 illustrates a functional block diagram of an encoding system including a source coder, which may be a video encoder according to an embodiment.

FIG. 9 may be a functional block diagram of an encoding system (400) including a source coder (203), which may be a video encoder (203) according to an embodiment of the present disclosure.

The encoder (203) may receive video samples from a video source (201) (that is not a part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device, which may include a memory and processor, that stores previously prepared video. In a videoconferencing system, the video source (201) may include a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence in real time or under any other time constraints as required by the application. Enforcing appropriate coding speed is one function of controller (450). The controller 450 may control other functional units as described below and is functionally coupled to these units. The coupling is not depicted for clarity. Parameters set by the controller 450 can include rate control related parameters (e.g., picture skip, quantizer, lambda value of rate-distortion optimization techniques), a picture size, a group of pictures (GOP) layout, a maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of a source encoder (430) ("source coder" or "source encoder" henceforth), which is responsible for creating symbols based on an input picture to be coded, and a reference picture(s), and a local decoder (433) embedded in the encoder (203) that reconstructs the symbols to create the sample data a remote decoder 210 would also would create (as any compression between symbols and coded video bitstream is lossless in the video compression technologies considered in the disclosed subject matter). That reconstructed sample stream is input to the reference picture memory (434).

As the decoding of a symbol stream leads to bit-exact results independent of a decoder location (local or remote), the reference picture buffer content is also bit exact between local encoder and remote encoder. In other words, the prediction part of an encoder "sees," as reference picture samples, exactly the same sample values as a decoder would "see" when using prediction during decoding. This fundamental principle of reference picture synchronicity (and resulting drift, if synchronicity cannot be maintained, for example, because of channel errors) is well known to a person skilled in the art.

The operation of the "local" decoder (433) can be the same as of a "remote" decoder (210), which has already been described in detail above in conjunction with FIG. 8. Briefly referring also to FIG. 8, however, as symbols are available and en/decoding of symbols to a coded video sequence by entropy coder (445) and parser (320) can be lossless, the entropy decoding parts of decoder (210) (including channel (312), receiver (310), buffer (315), and parser (320)) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies are the inverse of the described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder, the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the source encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450), which may include a processor, may manage coding operations of the source coder (203), including, for example, setting of parameters and subgroup parameters used for encoding the video data.

Output of all aforementioned functional units may be subjected to entropy coding in the entropy coder (445). The entropy coder may translate the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the source coder (203) with other data to be transmitted, for example, coded audio data and/or ancillary data streams.

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types from among, for example, an Intra Picture (I picture), a Predictive picture (P picture) and a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction).

Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The source coder (203) may perform coding operations according to a predetermined video coding technology or standard, such as ITU-T Rec. H.265, or Versatile Video Coding (VVC). In its operation, the source coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, the coding of the coded video sequence can be in accordance with a video coding technology or standard, and can follow principles well known to a person skilled in the art, including variable length coding, Huffman coding, arithmetic coding with or without context sensitivity, and so forth. In some streaming systems, the video bitstreams (204, 207, 209) can be encoded according to certain video coding/compression standards. An example of those standards include ITU-T HEVC Recommendation of H.265.

Point-Cloud Compression

In Test Model 13 (TMC13) in the Motion Picture Experts Group (MPEG), geometry information and the associated attributes, such as color or reflectance, may be separately compressed. The geometry information, which is the 3D coordinates of the point clouds, may be coded by octree-partition(s) with occupancy information of the octree-partition(s). The attributes may then be compressed based on reconstructed geometry using prediction, lifting and region adaptive hierarchical transform techniques. The octree partition and occupancy encoding processes are described more below.

Octree Partition(s)

Figure 1:
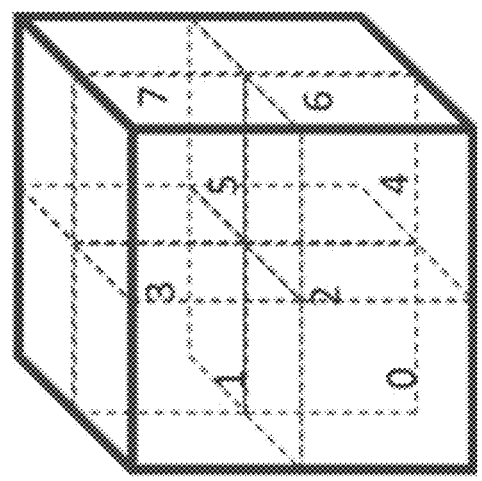
FIG. 1 shows an illustration of an octree-partition according to an embodiment.

FIG. 1 shows an illustration of an octree-partition according to an embodiment. In TMC13, when the octree geometry coder-decoder (codec) is used, the geometry encoding proceeds as follows. First, a cubical axis-aligned bounding box B is defined by two points (0,0,0) and $(2^{M-1}, 2^{M-1}, 2^{M-1})$, where $2^{M-1}$ defines the size of B and M is specified in the bitstream.

An octree structure is then built by recursively subdividing B. At each stage, a cube is subdivided into 8 sub-cubes. An 8-bit code, namely the occupancy code, may then be generated by associating a 1-bit value with each sub-cube to indicate whether it contains points (i.e., full and has value 1) or not (i.e., empty and has value 0). Only full sub-cubes with a size greater than 1 (i.e., non-voxels) are further subdivided (e.g., by performing another octree partition of the sub-cube that is full).

Figure 2:
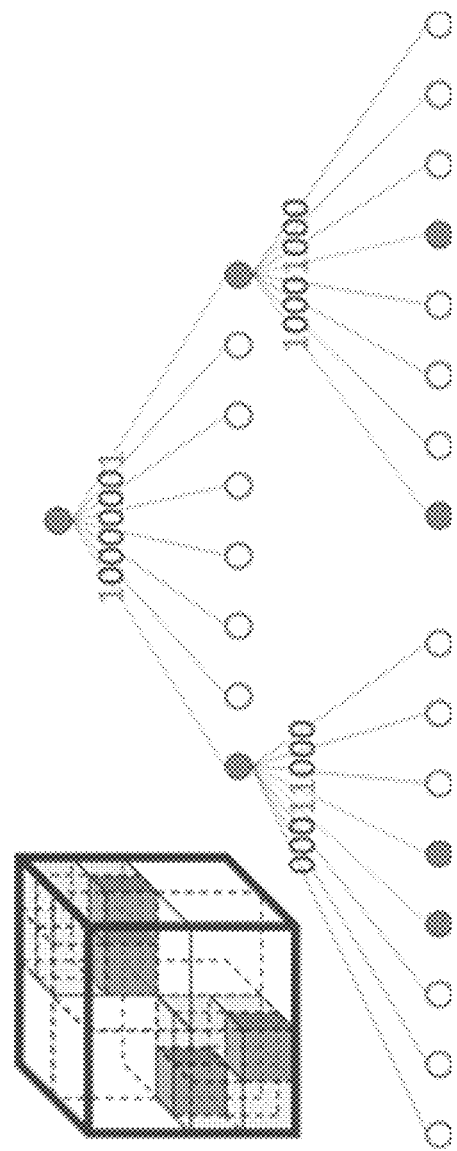
FIG. 2 illustrates an example of a two-level octree partition, the tree structure and the corresponding occupancy codes.

FIG. 2 illustrates an example of a two-level octree partition, the tree structure and the corresponding occupancy codes (e.g., 10000001, 00011000, 10001000), where cubes and nodes in dark indicate that the respective cubes and nodes are occupied by points (i.e., full).

Encoding of Occupancy Code(s)

The occupancy code of each node may be compressed by an arithmetic encoder. The occupancy code can be denoted as S which is an 8-bit integer, and each bit in S may indicate the occupancy status of the corresponding child node. Two encoding methods for occupancy codes exist in TMC13: bit-wise encoding method and byte-wise encoding method. The bit-wise encoding may be enabled by default. In both bit-wise and byte-wise approaches, arithmetic coding with context modeling may be adopted to encode the occupancy code(s), where the context status is initialized at the beginning of the whole coding process and is updated during the coding process.

For bit-wise encoding, eight bins in S are encoded in a certain order where each bin is encoded by referring to the occupancy status of neighboring nodes and child nodes of neighboring nodes, where the neighboring nodes are in the same level of the current node.

For byte-wise encoding, S is encoded by referring to: an adaptive look up table (A-LUT), which keeps track of the N (e.g., 32) most frequent occupancy codes, and a cache (e.g., a second table in the cache), which keeps track of the most recent different observed M (e.g., 16) occupancy codes.

A binary flag indicating whether S is the A-LUT or not may be encoded. According to an embodiment, when S is in the A-LUT, the index in the A-LUT may be encoded by using a binary arithmetic encoder. According to an embodiment, when S is not in the A-LUT, then a binary flag indicating whether S is in the cache or not may be encoded. When S is in the cache, then the binary representation of the index of S may encoded by using a binary arithmetic encoder. Otherwise, when S is not in the cache, then the binary representation of S may be encoded by using a binary arithmetic encoder.

In some sense, the encoding using the octree partition is similar to variable length coding.

The decoding process starts by parsing the dimensions of the bounding box B from bitstream. The same octree structure is then built by subdividing B according to the decoded occupancy codes.

According to an embodiment, attributes of a point cloud can be color, reflectance etc.

According to an embodiment, methods of predictive attribute coding (e.g., how the residual is coded) may involve three steps:

Step 1: Selecting a predictor.

Step 2: Computing the difference between an attribute value and its predictor to obtain prediction residual.

Step 3: Entropy coding of the prediction residual.

Step 1 and Step 3 are critical steps which determine the efficiency of attribute coding.

In addition, point clouds often exhibit different characteristic: some point clouds, e.g., point clouds from human bodies or small objects, are rather dense where points are closely packed; some point clouds, e.g., points cloud from autonomous driving sampled from Lidar sensors, are rather sparse, especially at places far away from the sensors. Some points clouds, e.g., point clouds for a high definition map, have intermediate point density. It's important to design step 1 and step 3 that can adapt to different characteristics (e.g., different point cloud densities).

According to an embodiment, an encoder, decoder, or coder-decoder (codec) may be implemented by processing circuitry (e.g., one or more hardware processors or one or more integrated circuits). In one example, the one or more processors may execute a program that is stored in a non-transitory computer-readable medium.

According to an embodiment, g[i] and a[i] may be used to represent the geometry position and attribute value for the i-th point in a point cloud, respectively. The corresponding predictor may be denoted as p[i] and the prediction residual may be denoted as r[i]=a[i]−p[i]. According to an embodiment, a[i], p[i] and r[i] can be a vector or a scalar. For example, according to an embodiment, a[i], p[i] and r[i] may be 3-dimensional vectors when the attribute is red-green-blue (RGB) color or scalars when the attribute is reflectance.

According to an embodiment, methods of coding prediction residuals are provided.

According to an embodiment, methods of predictor selection may be provided followed by methods to adaptively choose among different prediction selection methods.

Coding Prediction Residuals

Prediction residuals often exhibit Gaussian or Laplacian distribution, where most of the values are close to zero. According to an embodiment, this "close to zero" characteristics may be utilized for entropy coding.

In one embodiment, a prediction residual r[i] may be first converted to non-negative number R[i], as in the following formula:

$$R[i] = \begin{cases} 0 & \text{when } r[i] = 0 \\ 2r[i] & \text{when } r[i] > 0 \\ -2r[i] - 1 & \text{when } r[i] < 0 \end{cases} \quad \text{(Eq. 1)}$$

For convenience, R[i] is called converted prediction residual. To code RN, according to an embodiment, the following hybrid approach may be used: when R[i]<$TU_{max}$, a truncated unary (TU) code with a maximum value, $TU_{max}$, may be used.

According to an embodiment, the TU code may be a simple code (e.g., 110). When the R[i] is less than threshold, TU may be used. When the R[i] is not less than the threshold, then an exponential code may be used.

For example, when R[i]≥$TU_{max}$, TU code equals $TU_{max}$ followed by Exponential Golomb code with order 0 (EGK) to encode R[i]−$TU_{max}$ is used.

For the bits in the TU code, context based arithmetic code is used while bypass coding is used for bits in the EGK code.

One example is TU max=3. According to an embodiment, a first check of whether zero or not may be performed, followed by a check if one or not, and a check for two or not and so on.

When $TU_{max}$=3, the syntax table for converted prediction residual R[i] may be as follows:

TABLE 1

| Prediction_residual ( ) { | Descriptor |
|---|---|
|   converted_prediction_residual_is_zero | ae(1) |
|   if ( !converted_prediction_residual_is_zero ) { | |
|     converted_prediction_residual_is_one | ae(1) |
|     if (!converted_prediction_residual_is_one) { | |
|       converted_prediction_residual_is_two | ae(1) |
|       if (!converted_prediction_residual_is_two) { | |
|         converted_prediction_residual_minus_three | ue(v) |
|       } | |
|     } | |
|   } | |
| } | | converted_prediction_residual_is_zero specifies if R [i] equals to 0
converted_prediction_residual_is_one specifies if R [i] equals to 1
converted_prediction_residual_is_two specifies if R [i] equals to 2
converted_prediction_residual_minus_three specifies R [i] as follows,
R [i] = converted_prediction_residual_minus_three + 3.

In one embodiment, $TU_{max}$=2, the syntax table is omitted for simplicity.

In another embodiment, $TU_{max}$=1 the syntax table for converted prediction residual R[i] may be as follows:

TABLE 2

| Prediction_residual ( ) { | Descriptor |
|---|---|
|   converted_prediction_residual_is_zero | ae(1) |
|   if ( !converted_prediction_residual_is_zero ) { | |
|     converted_prediction_residual_minus_one | ue(v) |
|   } | |
| } | | converted_prediction_residual_is_zero specifies if R [i] equals to 0
converted_prediction_residual_minus_one specifies R [i] as follows,
R [i] = converted_prediction_residual_minus_one + 1.

In another embodiment, $TU_{max}$=0. In this case, only EGK code is used. The syntax table for converted prediction residual R[i] is simplified as follows:

TABLE 3

| Prediction_residual ( ) { | Descriptor |
|---|---|
|   converted_prediction_residual | ue(v) |
| } | | converted_prediction_residual specifies R [i] as follows,
R [i] = converted_prediction_residual.

Since for different point cloud exhibiting different characteristics or for a same point cloud with different attribute quantization parameter, the converted prediction residual may have different statistics. An adaptive scheme may be desirable.

In one embodiment, $TU_{max}$ is first set as a maximum value, for example, 3. When start coding converted prediction residuals, the number of converted prediction residuals equals i, denoted as freq($b_i$) or freq(i), where i=0, 1, . . . $TU_{max}$−1, is collected for a period of T points, for example T=512.

Figure 3:
FIG. 3 shows statistics collection at a first period of T points and adaptive parameter determination.

For example, as illustrative of the concept, FIG. 3 shows statistics collection at a first period of T points and adaptive parameter determination.

According to an embodiment, the probability of each bit may be computed in the TU code, i.e., $b_0 b_1 \ldots b_{TU_{max}-1}$. For example, $$Prob(b_i = 1) = \frac{freq(b_i)}{T}, i = 0, \ldots, TU_{max} - 1 \quad \text{(Eq. 2)}$$

In one embodiment, when Prob($b_m=1$) is close to 0.5, $TU_{max}$ is set as m.

In another embodiment, when Prob($b_m=1$), Prob($b_{m+1}=1$), ... Prob($b_{TU_{max}-1}=1$) are all close to 0.5, $TU_{max}$ is reduced to equal to m.

According to an embodiment, as previously discussed, EGK with bypass coding may be used to code $R[i]-TU_{max}$ when $R[i] \geq TU_{max}$. In one embodiment, Exponential Golomb code with order k>0 may be be used to encode $R[i]-TU_{max}$ when $R[i] \geq TU_{max}$.

In another embodiment, the order of Exponential Golomb code can be adaptively chosen based on the statistics collected for a period T:

When coding of converted prediction residuals is started, the frequency of converted prediction residuals equals 0, 1, ..., $TU_{max}-1$ is collected for a period T points.

In addition, the summation of all converted prediction residuals within the period T points are computed, and denoted as $S_T$.

With these statistics, the average of converted prediction residuals that are greater than or equal to $TU_{max}$ may be computed, for example, based on the following Equation 3 (Eq. 3):

$$A_T = \frac{S_T - freq(1) - 2freq(1) - (TU_{max}-1)freq(TU_{max}-1)}{T - freq(0) - freq(1) - \ldots - freq(TU_{max}-1)} \quad \langle\text{Eq. 3}\rangle$$

At the beginning of encoding, EGK is used. After a period of T points, $A_T$ is computed. If $A_T > Th(K)$ and $A_T < Th(K+1)$, order K is chosen for coding the following points. Note Th(1), Th(2), ..., Th($k_{max}$) are a set of pre-defined threshold with increasing values and $k_{max}$ is the maximum order for Exponential Golomb code in the application.

In one embodiment, besides the summation of all converted prediction residuals, the number of all converted prediction residuals greater than a threshold $Th_R$ denoted as $N_{Th}$ and their summation, $S_{Th}$ are collected for the period T. According to an embodiment, the average of converted prediction residuals that are greater than $Th_R$ can be computer, such as, based on the following Equation 4 (Eq. 4):

$$A_{Th} = \frac{S_{Th}}{N_{Th}}, \quad (\text{Eq. 4})$$

where $A_{Th}$ is used to replace $A_T$ to determine the order of Exponential Golomb code.

In one embodiment, the collection of converted residual statistics and adaptive selection $TU_{max}$ and $k_{max}$ may be performed at the beginning of every consecutive chunk of points, where number of points in each chunk is C.

Figure 4:
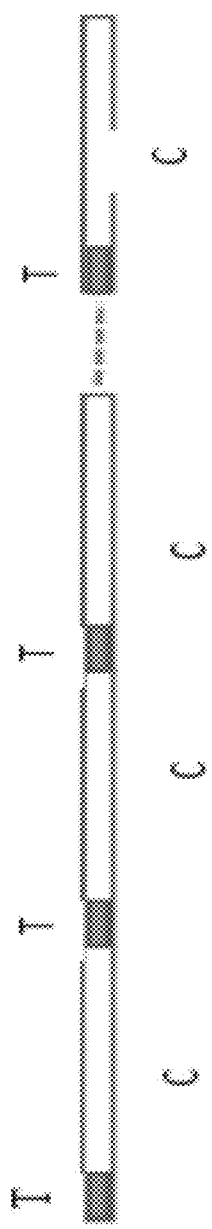
FIG. 4 shows, as an illustration of the concept of an embodiment, collection of statistics and adaptive parameter determination at every chunk.

For example, FIG. 4 shows, as an illustration of the concept of an embodiment, collection of statistics and adaptive parameter determination at every chunk. That is, compared to FIG. 3, FIG. 3 shows at the beginning, and FIG. 4 shows periodically (e.g., at every chunk). In one embodiment, the prediction residual r[i] may be directly coded. According to an embodiment, at first, one-bit sign of r[i], $$s[i] = \begin{cases} 1 & r[i] > 0 \\ 0 & r[i] < 0 \end{cases} \quad (\text{Eq. 5})$$

may be coded using binary arithmetic code with context modeling.

The absolute value of r[i] may be coded, and denoted as abs(r[i]), using the same approach as mentioned above except for the addition of the sign bit. In one embodiment, when $TU_{max}=1$, the syntax table for prediction residual r[i] may be as follows:

TABLE 4

| Prediction_residual ( ) { | Descriptor |
|---|---|
|   prediction_residual_is_zero | ae(1) |
|   if ( ! prediction_residual_is_zero ) { | |
|     sign_of_prediction_residual | ae(1) |
|     absolute_prediction_residual_is_one | ae(1) |
|     if (!absolute_prediction_residual_is_one) { | |
|       absolute_prediction_residual_is_two | ae(1) |
|       if (!absolute_prediction_residual_is_two) { | |
|         absolute_prediction_residual_minus_three | ue(v) |
|       } | |
|     } | |
|   } | |
| } | |

Where the prediction_residual_is_zero specifies when r[i] equals to 0 in Table 4.

Where the sign_of_prediction_residual specifies the sign of r[i] as based on the following Equation 6:

$$\text{sign}(r[i]) = \begin{cases} 1 & \text{sign\_of\_prediction\_residual} = 1 \\ -1 & \text{sign\_of\_prediction\_residual} = 0 \end{cases} \quad (\text{Eq. 6})$$

Where the absolute_prediction_residual_is_one specifies when abs(r[i]) equals to 1 in Equation 6.

Where the absolute_prediction_residual_is_two specifies when abs(r[i]) equals to 2 in Equation 6.

Where the absolute_prediction_residual_minus_three specifies r[i] as follows, r[i]=sign(r[i])×(absolute_prediction_residual_minus_three+3)

Predictor Selection

To code an attribute, according to an embodiment, the following two steps may be used: (1) construct a candidate list, and (2) based on certain criterion, choose the best candidate in the candidate list as the predictor. In the following section, the size of a candidate list is denoted as $N_{cand}$, which can be pre-defined or signaled in high level syntax such as a sequence parameter set, an attribute parameter set, a slice header, etc.

Construction of Candidate List

In one embodiment, attribute coding follows the geometry coding order, i.e., the attribute of a point is coded after the geometry position of the point is coded. The candidate list for the i-th point comprises the $N_{cand}$ recent coded points, i.e., denoted as in the following Equation 7:

$$\text{cand\_list} = \{(g[i-1],a[i-1]),(g[i-2],a[i-2]), \ldots ,(g[i-N_{cand}],a[i-N_{cand}])\} \quad (7)$$

Where the points are ordered in geometry coding order in Eq. 7.

According to an embodiment, a candidate list may be implemented as a sliding buffer. A new point may be inserted at the beginning of the list and the last point may get pushed out of the list. In one embodiment, before insertion of a new point, a geometry position and attribute value of the new point are compared with the geometry position and attribute value of the candidates in the candidate list. When there is a point of a candidate in the candidate list with the same geometry position and attribute, the new point is not inserted. When there is not a point of a candidate in the candidate list with the same geometry position and attribute, the new point may be inserted as usual.

In one embodiment, attribute coding is performed after the geometry coding has been performed for a point cloud or a part of a point cloud. All the geometry coded points may be ordered using Morton order or other space filling order (Morton order is used as an example only). Except the points may be ordered differently, methods to construct a candidate list are the same as discussed above.

In other words, there are specific ways to construct the candidate. The general approach is that the candidate list is constructed, and one of the candidates in the candidate list is chosen as a predictor. However, when there is a duplicate, no insertion is made. Geometry-Based Predictor Selection According to an embodiment, the predictor may be selected based on geometry position of the points in the candidate list and the i-th point. In one embodiment, the predictor may be chosen as the closest point to the i-th point, such as shown in the following Equation 8:

$$pred_{index} = \underset{k=0,\ldots,N_{cand}-1}{\mathrm{argmin}} \; \|g[i] - g[i-1-k]\|_p^p \quad \text{(Eq. 8)}$$

Where $\|g\|_p$ represents the p-normal operation of a point $g=(x, y, z)$ in Equation 8.

In one embodiment, p=1 or p=2 (p meaning the predictor). According to an embodiment, three coordinates (x, y, z) in the normal operation may be treated equally.

In one embodiment, a weighted normal operation may be defined, such as in the following Equation 9:

$$\|g\|_{w,p}^p = w_1 x^p + w_2 y^p + w_3 z^p$$

and the predictor may be chosen as the closest point to the i-th point, shown as the following Equation 9:

$$pred_{index} = \underset{k=0,\ldots,N_{cand}-1}{\mathrm{argmin}} \; \|g[i] - g[i-1-k]\|_{w,p}^p \quad \text{(Eq. 9)}$$

According to an embodiment, the weight parameter $w_1$, $w_2$, $w_3$ may be pre-defined or signaled in the high-level syntax.

According to an embodiment, a decoder may carry out the same operation to determine the predictor index $pred_{index}$, such that there is no need to signal it in the syntax.

Attribute-Based Predictor Selection

In this method, the predictor (e.g., p) may be selected based on attribute values of the points in the candidate list and the i-th point. In one embodiment, the predictor chosen as the one that has the closet attribute value to that of the i-th point may be based on, for example, the following Equation 10:

$$pred_{index} = \underset{k=0,\ldots,N_{cand}-1}{\mathrm{argmin}} \; \|a[i] - a[i-1-k]\|_p^p \quad \text{(Eq. 10)}$$

In one embodiment, p=1 or p=2. When an attribute is a scalar value, p=1 always.

A decoder may not have the knowledge of a[i], and hence $pred_{index}$ cannot be determined in the decoder and needs to be signaled in the syntax. In one embodiment, $pred_{index}$ is binarized into a fixed-length code and arithmetic code is used to encode individual bits with context modeling. The number of bits for the fixed-length code may depend on the range of $pred_{index}$.

In one embodiment, $pred_{index}$ is binarized into a truncate unary (TU) code with a maximum value set as the maximum value of $pred_{index}$. For the first few bits in the TU code, arithmetic code with context modeling may be used to code for first few bits in the TU code; the rest of bits are coded in bypass mode. In another embodiment, all the bits in TU code are coded using arithmetic code with context modeling.

In one embodiment, the $pred_{index}$ may be coded using a TU code followed by EGK code, as described previously where the bits in the TU is coded using arithmetic code with context modeling.

Adaptive Predictor Selection Since different point clouds exhibit different characteristics, geometry-based prediction selection may be better than an attribute-based predictor selection method for one type of point clouds but inferior to it for another type of point clouds. An adaptive scheme is desirable.

That is, one is based on attributes and one is based on geometry. Thus, statistics are accumulated and the average of the residual is computed. Only when the residual overhead is large, can signaling the index be justified. According to an embodiment, the average of the residual may be determined (e.g., per chuck) and it may be determined whether to use the attribute-based predictor or geometry based predictor based on the determined average of the residual.

In particular, the attribute-based predictor selection method often offers better prediction but suffers from the overhead of signaling $pred_{index}$. When the prediction residual from the geometry-based method is very large, attribute-based method often provides better performance.

Based on this observation, according to an embodiment, the statistics may be collected (discussed above) and the average of converted prediction residuals that are greater than or equal to $TU_{max}$, (i.e., $A_T$ at the beginning of period of T) may be computed.

According to an embodiment, the adaptive method may include: An encoder starting with a geometry-based predictor method. After a period of T, $A_T$ is computed and compared with a threshold, $Th_{pred}$.

If $A_T > Th_{pred}$, attribute-based predictor selection is used.

According to an embodiment, $Th_{pred}$ may be pre-defined or signaled in the high-level syntax. $Th_{pred}$ may be different for lossless coding and lossy coding.

In another embodiment, $A_{Th}$, the average of converted prediction residuals that are greater than $Th_R$, can be computed and may be used to replace $A_T$ to make the decision.

In one embodiment, the collection of prediction residual statistics can be done at the beginning of every consecutive chunk of points, $A_T$ (or $A_{Th}$) for each chunk can be computed and compared with two threshold ($Th_{pred}^H$, $Th_{pred}^L$) where $Th_{pred}^L < Th_{pred}^H$.

According to an embodiment, the adaptive scheme for each chunk is as following:

If $A_T < Th_{pred}^L$, switch to geometry-based predictor selection.

If $A_T > Th_{pred}^H$, switch to attribute-based predictor selection.

Otherwise, no change of prediction selection method.

According to an embodiment, for lossless coding or lossy code, the pair ($Th_{pred}^H$, $Th_{pred}^L$) could be different.

In another embodiment, the best prediction candidate is selected based on the rate-distortion optimization methods where the best candidate leads to a minimal cost of rate and distortion function.

That is, rate distortion may be used to determine missed costs. Thus, the details include how the attribute was coded and how it is selected.

Figure 5:
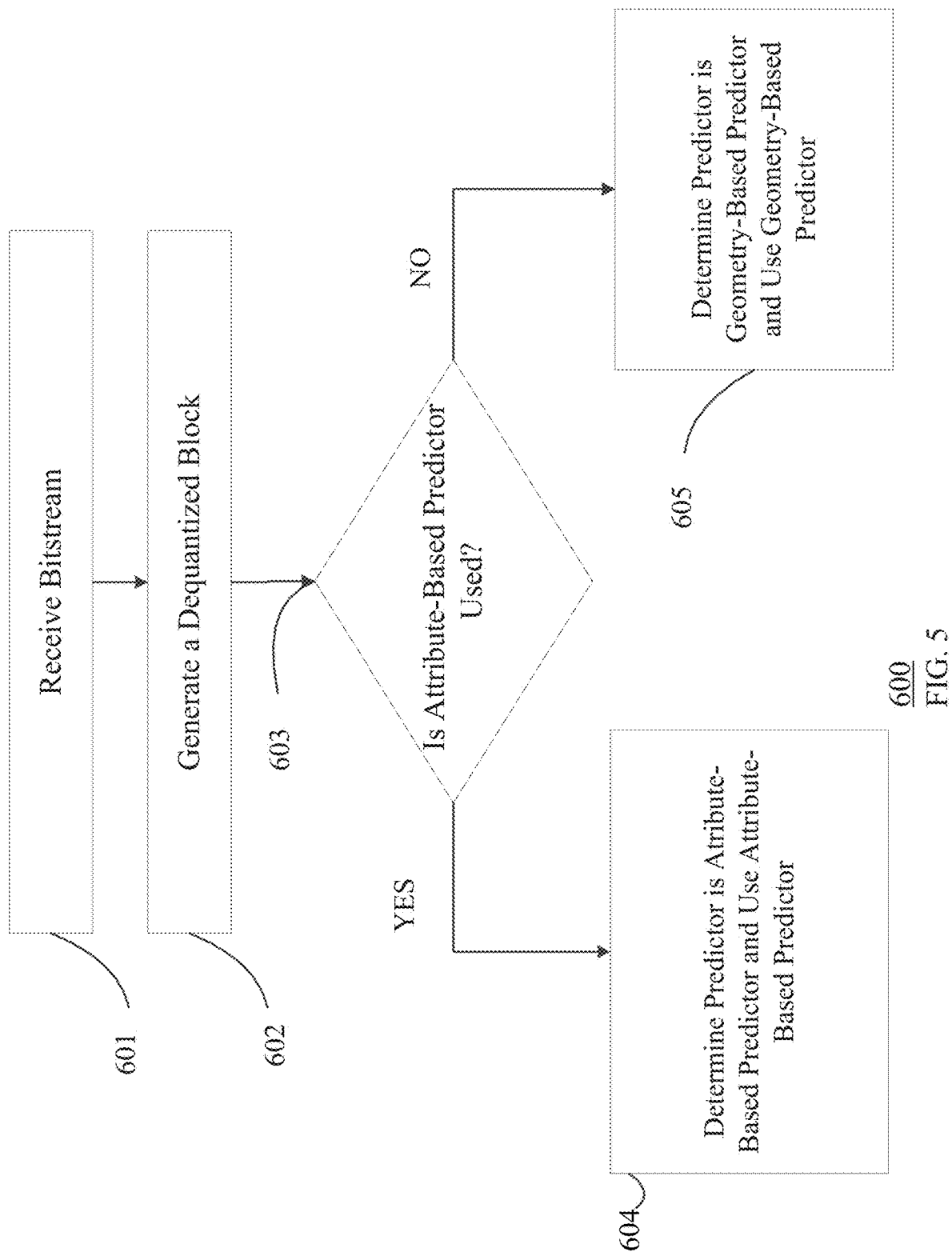
FIG. 5 shows an operational flowchart illustrating the steps of a method for decoding video data is depicted.

Referring now to FIG. 5, an operational flowchart illustrating the steps of a method 600 for decoding video data is depicted. However, one of ordinary skill can appreciate how the encoding process would work based on FIG. 5. In some implementations, one or more process blocks may be performed by the computer 102 and the server. In some implementations, one or more process blocks may be performed by another device or a group of devices separate from or including the computer and the server.

Embodiments relate to a method, system, and non-transitory computer readable medium for encoding and/or decoding video data. According to one aspect, a method for decoding video data is provided.

As shown in FIG. 5, the method may include: receiving an entropy coded bitstream comprising compressed video data including point cloud occupancy codes (Step 601).

At Step 602, the method may include generating one or more dequantized dimensions of a boundary box of a point cloud by a process. The process for dequantized dimensions may include: parsing dimensions of the boundary box of the point cloud from the bitstream; entropy-decoding the entropy coded dimensions of the boundary box of the point cloud; and dequantizing the dimensions of the boundary box of the point cloud.

At step 603, the method may include determining whether the compressed video data was predicted by using an attribute-based predictor or a geometry-based predictor;

At Step 604, the method may include: based on determining that the compressed video data was predicted by using the attribute-based predictor (I.e., Step 603: Yes), determining a predictor for decoding is the attribute-based predictor (Step 604).

The method may include: based on determining that the compressed video data was predicted by using the attribute-based predictor (i.e., Step 603: No), determining the predictor for decoding is the geometry-based predictor; and building an octree structure by subdividing the boundary box of the point cloud according to the dequantized dimensions of the boundary box including the occupancy codes of the point cloud by using the determined predictor.

The method may further comprise: selecting the attribute-based predictor or the geometry-based predictor based on a geometry position of points in a candidate list.

The method may further comprise: determining whether the compressed video data was predicted by using the attribute-based predictor or the geometry-based predictor based on signaling in syntax of the bitstream.

The method may further comprise: when an attribute of the occupancy codes is a scalar value, determining that the predictor for decoding is the geometry-based predictor.

The predictor for decoding may be binarized into a fixed-length code and individual bits are arithmetic code encoded with context modeling.

The predictor for decoding may be binarized into a truncate unary (TU) code with a maximum value set as the maximum value of the predictor for decoding.

The attributes of the point cloud may include one or more of color or reflectance.

The method may further comprise: determining an average of a residual per chuck for each of the attribute-based predictor and the geometry-based predictor; and determining whether to use the attribute-based predictor or the geometry-based predictor based on the determined averages of the residual.

The method may further comprise: when a residual or a converted residual is less than a truncated unary (TU) code maximum, using a TU code with a maximum value for the encoding; and when the residual or the converted residual is not less than the TU code maximum, using an exponential code for the encoding.

The exponential code may be an Exponential Golomb code with order 0.

The method may further comprise: for bits in the TU code, using a context based arithmetic code; and for bits in the exponential code, using bypass coding.

The method may further comprise: starting with the geometry-based predictor; after a period of time, comparing a chunk of points with a threshold; when the chunk of points is greater than the threshold, using the attribute-based predictor.

The method may further comprise: selecting a best prediction candidate based on a rate-distortion optimization method where the best prediction candidate leads to a minimal cost of rate and distortion function.

The method may further comprise: generating a displayable image based at least in part on the built octree structure; and performing control so that the displayable image is displayed by a display.

According to an embodiment, a computer system for decoding video data may be provided, which may comprise: one or more computer-readable non-transitory storage media configured to store computer program code; and one or more computer processors configured to access said computer program code and operate as instructed by said computer program code, said computer program code including: receiving code configured to cause the one or more computer processors to receive an entropy coded bitstream comprising compressed video data including point cloud occupancy codes; dequantization code configured to cause the one or more computer processors to generate one or more dequantized dimensions of a boundary box of the point cloud by a process comprising: parsing dimensions of the boundary box of the point cloud from the bitstream, entropy-decoding the entropy coded dimensions of the boundary box of the point cloud, and dequantizing the dimensions of the boundary box of the point cloud; determining code configured to cause the one or more computer processors to determine whether the compressed video data was predicted by using an attribute-based predictor or a geometry-based predictor; predictor selection code configured to cause the one or more computer processors to: based on determining that the compressed video data was predicted by using the attribute-based predictor, determining a predictor for decoding is the attribute-based predictor; based on determining that the compressed video data was predicted by using the attribute-based predictor, determining the predictor for decoding is the geometry-based predictor; and octree building code configured to cause the one or more computer processors to build an octree structure by subdividing the boundary box of the point cloud according to the dequantized dimensions of the boundary box including the occupancy codes of the point cloud by using the determined predictor.

The predictor selection code may be further configured to cause the one or more computer processors to: determine whether the compressed video data was predicted by using the attribute-based predictor or the geometry-based predictor based on signaling in syntax of the bitstream.

The computer system may further comprise a display, wherein the computer program code further comprises: display code configured to cause the at one or more processors to: generate a displayable image based at least in part on the built octree structure, and perform control so that the displayable image is displayed by the display.

The attributes of the point cloud may include one or more of color or reflectance.

According to an embodiment, a non-transitory computer readable medium having stored thereon a computer program for decoding video data\ may include where the computer program is configured to cause one or more computer processors to: receive an entropy coded bitstream comprising compressed video data including point cloud occupancy codes; generate one or more dequantized dimensions of a boundary box of a point cloud by a process comprising: parsing dimensions of the boundary box of the point cloud from the bitstream; entropy-decoding the entropy coded dimensions of the boundary box of the point cloud; and dequantizing the dimensions of the boundary box of the point cloud; determining whether the compressed video data was predicted by using an attribute-based predictor or a geometry-based predictor; based on determining that the compressed video data was predicted by using the attribute-based predictor, determining a predictor for decoding is the attribute-based predictor; based on determining that the compressed video data was predicted by using the attribute-based predictor, determining the predictor for decoding is the geometry-based predictor; and build an octree structure by subdividing the boundary box of the point cloud according to the dequantized dimensions of the boundary box including the occupancy codes of the point cloud by using the determined predictor.

The computer program of the non-transitory computer-readable storage medium may be further configured to cause the one or more computer processors to: generate a displayable image based at least in part on the built octree structure; and perform control so that the displayable image is displayed by a display.

It may be appreciated that the flow charts (e.g., FIG. 5) provide only an illustration of one implementation and does not imply any limitations with regard to how different embodiments may be implemented. Many modifications to the depicted environments may be made based on design and implementation requirements.

The techniques for encoding/decoding can be implemented by one or more processors that may execute computer software having computer-readable instructions that may be physically stored in one or more computer-readable media (e.g., a hard disk drive). For example, FIG. 10 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
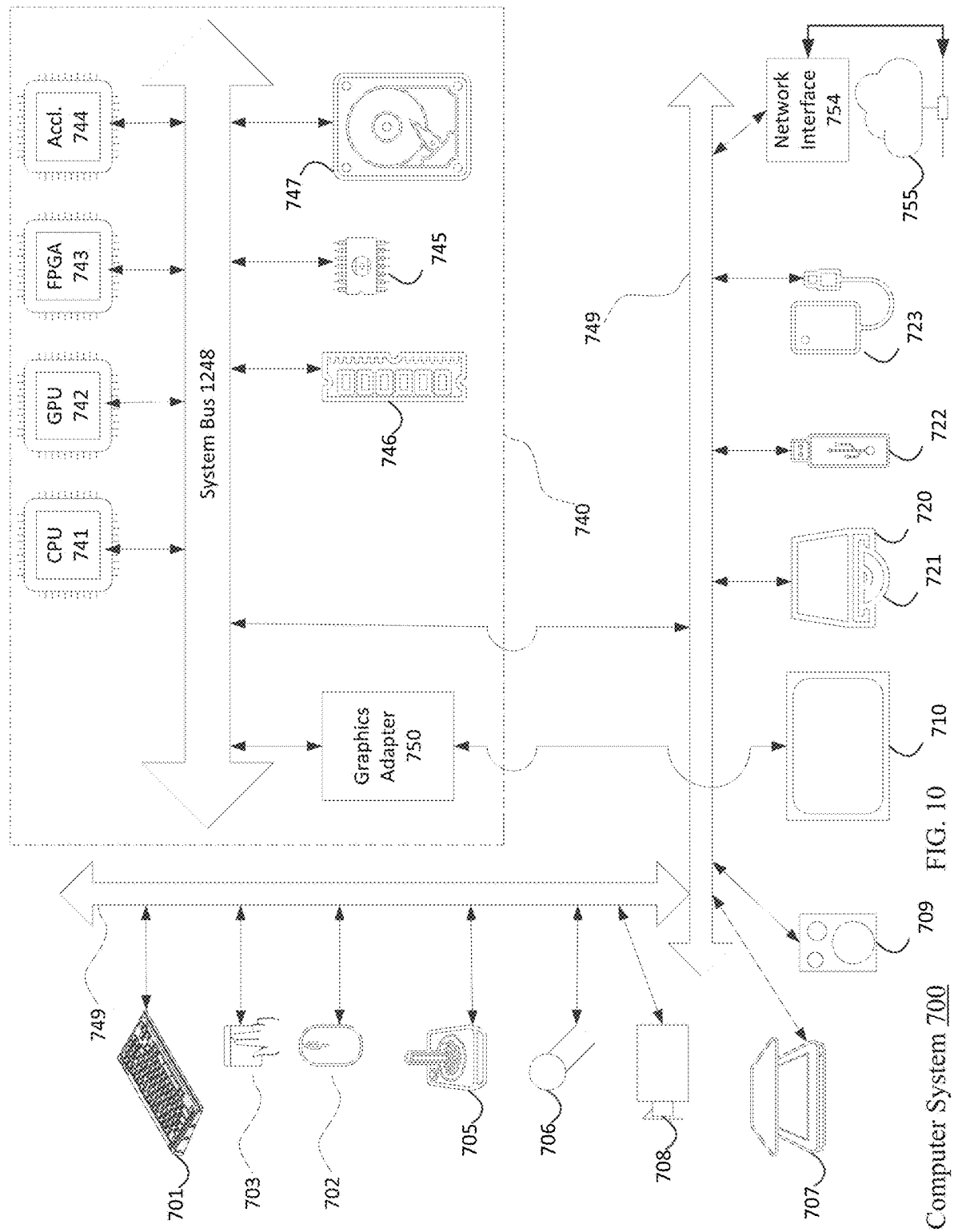
FIG. 10 shows a computer system 700 suitable for implementing certain embodiments of the disclosed subject matter.

The components shown in FIG. 10 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove 704, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove 704, or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" or "computer readable medium" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software.

In addition or as an alternative, the computer system 700 may provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of decoding comprising:
   receiving an entropy coded bitstream comprising compressed video data including point cloud occupancy codes;
   generating one or more dequantized dimensions of a boundary box of a point cloud by a process comprising:
      parsing dimensions of the boundary box of the point cloud from the bitstream;

entropy-decoding the entropy coded dimensions of the boundary box of the point cloud; and dequantizing the dimensions of the boundary box of the point cloud; determining whether the compressed video data was predicted by using an attribute-based predictor or a geometry-based predictor; based on determining that the compressed video data was predicted by using the attribute-based predictor, determining a predictor for decoding is the attribute-based predictor;

based on determining that the compressed video data was predicted by using the attribute-based predictor, determining the predictor for decoding is the geometry-based predictor; and building an octree structure by subdividing the boundary box of the point cloud according to the dequantized dimensions of the boundary box including the occupancy codes of the point cloud by using the determined predictor.

2. The method of claim 1, further comprising:
selecting the attribute-based predictor or the geometry-based predictor based on a geometry position of points in a candidate list.

3. The method of claim 1, further comprising: determining whether the compressed video data was predicted by using the attribute-based predictor or the geometry-based predictor based on signaling in syntax of the bitstream.

4. The method of claim 1, further comprising: when an attribute of the occupancy codes is a scalar value, determining that the predictor for decoding is the geometry-based predictor.

5. The method of claim 1, wherein the predictor for decoding is binarized into a fixed-length code and individual bits are arithmetic code encoded with context modeling.

6. The method of claim 1, wherein the predictor for decoding is binarized into a truncate unary (TU) code with a maximum value set as the maximum value of the predictor for decoding.

7. The method of claim 1, wherein attributes of the point cloud include one or more of color or reflectance.

8. The method of claim 1, further comprising:
determining an average of a residual per chuck for each of the attribute-based predictor and the geometry-based predictor; and determining whether to use the attribute-based predictor or the geometry-based predictor based on the determined averages of the residual.

9. The method of claim 1, further comprising:
when a residual or a converted residual is less than a truncated unary (TU) code maximum, using a TU code with a maximum value for the encoding; and when the residual or the converted residual is not less than the TU code maximum, using an exponential code for the encoding.

10. The method of claim 9, wherein the exponential code is an Exponential Golomb code with order 0.

11. The method of claim 9, further comprising:
for bits in the TU code, using a context based arithmetic code; and for bits in the exponential code, using bypass coding.

12. The method of claim 1, further comprising:
starting with the geometry-based predictor;
after a period of time, comparing a chunk of points with a threshold;
when the chunk of points is greater than the threshold, using the attribute-based predictor.

13. The method of claim 1, further comprising selecting a best prediction candidate based on a rate-distortion optimization method where the best prediction candidate leads to a minimal cost of rate and distortion function.

14. The method of claim 1, further comprising:
generating a displayable image based at least in part on the built octree structure; and performing control so that the displayable image is displayed by a display.

15. A computer system for decoding video data, the computer system comprising:
one or more computer-readable non-transitory storage media configured to store computer program code; and one or more computer processors configured to access said computer program code and operate as instructed by said computer program code, said computer program code including:

receiving code configured to cause the one or more computer processors to receive an entropy coded bitstream comprising compressed video data including point cloud occupancy codes;

dequantization code configured to cause the one or more computer processors to generate one or more dequantized dimensions of a boundary box of the point cloud by a process comprising: parsing dimensions of the boundary box of the point cloud from the bitstream, entropy-decoding the entropy coded dimensions of the boundary box of the point cloud, and dequantizing the dimensions of the boundary box of the point cloud;

determining code configured to cause the one or more computer processors to determine whether the compressed video data was predicted by using an attribute-based predictor or a geometry-based predictor;

predictor selection code configured to cause the one or more computer processors to:
based on determining that the compressed video data was predicted by using the attribute-based predictor, determine a predictor for decoding is the attribute-based predictor;

based on determining that the compressed video data was predicted by using the attribute-based predictor, determine the predictor for decoding is the geometry-based predictor; and octree building code configured to cause the one or more computer processors to build an octree structure by subdividing the boundary box of the point cloud according to the dequantized dimensions of the boundary box including the occupancy codes of the point cloud by using the determined predictor.

16. The computer system of claim 15, wherein the predictor selection code is further configured to cause the one or more computer processors to:
determine whether the compressed video data was predicted by using the attribute-based predictor or the geometry-based predictor based on signaling in syntax of the bitstream.

17. The computer system of claim 15, further comprising:
a display, wherein the computer program code further comprises: display code configured to cause the at one or more processors to: generate a displayable image based at least in part on the built octree structure, and perform control so that the displayable image is displayed by the display.

18. The computer system of claim 15, wherein attributes of the point cloud include one or more of color or reflectance.

19. A non-transitory computer readable medium having stored thereon a computer program for decoding video data, the computer program configured to cause one or more computer processors to:
- receive an entropy coded bitstream comprising compressed video data including point cloud occupancy codes;
- generate one or more dequantized dimensions of a boundary box of a point cloud by a process comprising:
  - parsing dimensions of the boundary box of the point cloud from the bitstream;
  - entropy-decoding the entropy coded dimensions of the boundary box of the point cloud; and
  - dequantizing the dimensions of the boundary box of the point cloud;
- determine whether the compressed video data was predicted by using an attribute-based predictor or a geometry-based predictor;
- based on determining that the compressed video data was predicted by using the attribute-based predictor, determine a predictor for decoding is the attribute-based predictor;
- based on determining that the compressed video data was predicted by using the attribute-based predictor, determine the predictor for decoding is the geometry-based predictor; and
- build an octree structure by subdividing the boundary box of the point cloud according to the dequantized dimensions of the boundary box including the occupancy codes of the point cloud by using the determined predictor.

20. The non-transitory computer-readable storage medium of claim 19, wherein the computer program is configured to cause the one or more computer processors to:
- generate a displayable image based at least in part on the built octree structure; and
- perform control so that the displayable image is displayed by a display.

* * * * *